Patented Nov. 14, 1933

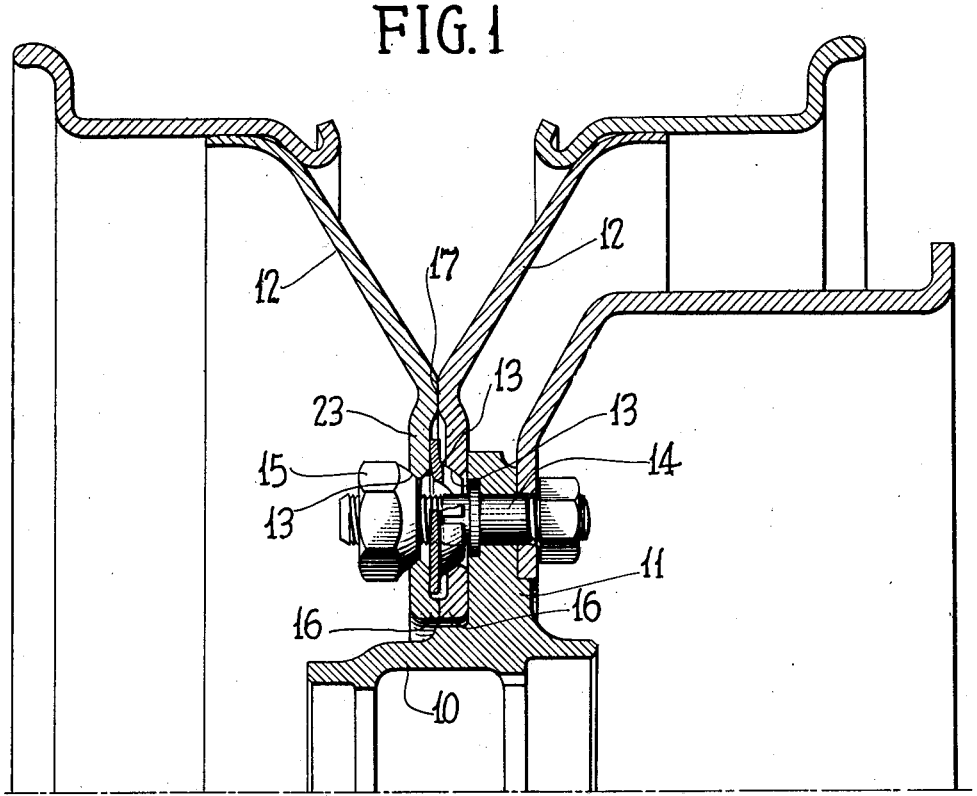
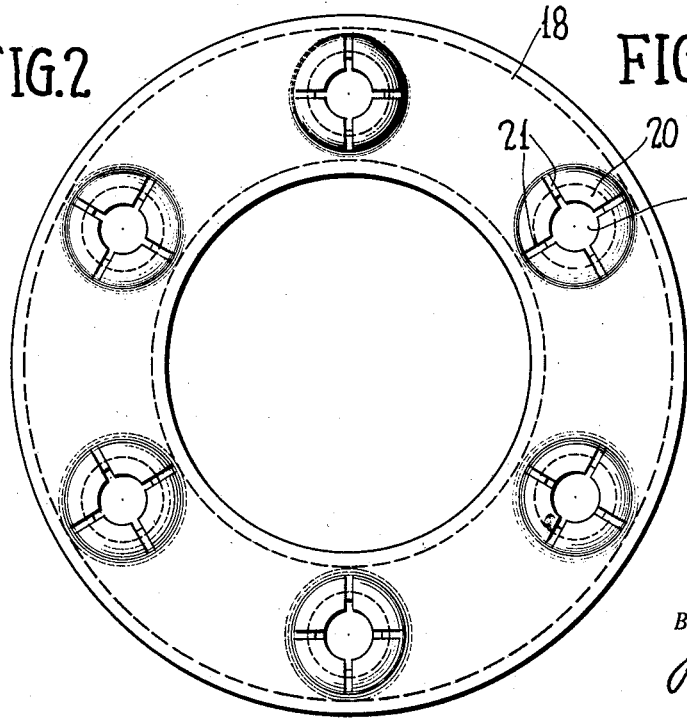
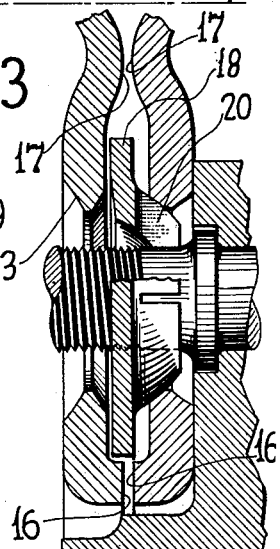

1,934,971

UNITED STATES PATENT OFFICE 1,934,971

DISK WHEEL MOUNTING

Carolus L. Eksergian, Detroit, Mich., assignor to Budd Wheel Company, Philadelphia, Pa., a corporation of Pennsylvania Application March 5, 1931, Serial No. 520,194
Renewed June 17, 1933

2 Claims. (Cl. 301—36)

My invention relates to the art of dual disk wheels and it has been my particular object to devise a dual wheel mounting affording both strength and resilience at a very slight expense. Further objects achieved by the development of this mounting relate to the provision of means to secure an inner dual disk in properly centered and clamped relationship with respect to the hub and bolts without the use of inner securing nuts. A still further object has been to devise yieldable means for interposition between a pair of dual disk wheels for the purpose of yieldably locking the securing nuts in place.

Further objects and advantages of my invention will be apparent from a reading of the sub-joined specification in the light of the attached drawing, in which Figure 1 is a central axial sectional view through my improved wheel.

Figure 2 is a detail side elevation of my securing ring, and

Figure 3 is an enlarged detail section illustrating the application of my improved wheel to a vehicle hub.

Referring to the drawing by reference characters, the numeral 10 indicates a hub of a vehicle provided with a radially extending flange 11 adapted to receive a vehicle wheel upon its outer face. The wheel body, in the present instance, consists of a pair of duplicate dual disks 12 and these disks are provided with coined openings 13 which are adapted to receive the securing nuts 15 which coact with bolts 14 projecting outwardly from the hub flange. Conical faces upon the nuts thus seat against the coined portions of the outer disk in securing the disks in place.

The wheel bodies have their inner radial extremities inturned as indicated at 16 and extend radially outwardly from these inturned portions in substantially plane portions 23 which extend beyond the periphery of the hub flange, these plane portions terminating in sharply ribbed portions 17. The flanges 16 and the ribs 17 on the complemental disks are adapted to abut in annular zones, when the nuts are brought home to secure the disks in place upon the hub flange. A resilient securing and locating ring 18 is interposed between the wheel bodies and provided with a plurality of openings 19 for the reception of the securing studs 14. These openings are coined inwardly as indicated at 20 adjacent the margins of the bolt receiving openings, and the inturned margins are slit as indicated at 21 to afford an additional resilience to this portion of the ring.

In the securement of my improved wheel body upon the hub, the inner disk 17 is first arranged over the securing bolts as illustratd in Figure 3. The securing ring is next passed over the bolts with its inturned margins 20 seating in the coined edges of the bolt receiving openings of the inner disk. The outer disk is next inserted over the bolts and the nuts are brought home upon the bolts to secure the entire assembly into place. As the nuts are brought home, the flange 18 abuts against the inner side of the outer disk. Further movement of the nuts tends to stress the resilient securing ring, effecting a flexure of the tongues 20 constituting the margins of the bolt holes of the securing ring. This movement also effects a certain amount of flexure of the main body 18 of the ring which is preferably formed of slightly concave cross section outwardly in order to provide a resilient flexing effect as the nuts are brought home. Further movement of the nuts causes the ribs 17 and the flanges 16 of the two disks to abut.

The manner in which I have achieved the objects of my invention will now be apparent. In the first place, the ribs 17 and flanges 16 afford provision for a certain amount of resilient approach of the outer disk toward the inner disk after these parts impinge, thus tending to stress the metal in the nave portion of the wheel and resiliently lock the nuts in place. A further factor in effecting this lock nut action is the ring 18 which is likewise stressed in the relative approach of the parts. The tongues 20 seat in the coined openings 13 of the inner disk and tend to secure this disk in properly centered relationship upon the hub flange and bolts without the necessity of employing inner securing nuts for this purpose. I am thus enabled, by the use of a very simple and inexpensive construction of dual wheel and locking ring, to effect a very secure affixment of the disk wheel bodies upon the hub flange. It will also be immediately obvious that the box section provided between the ribs 17 and the inturned flanges 16, together with the general arrangement of the locking ring and wheel parts affords a very sturdy wheel nave structure.

Modifications will be obvious to those skilled in the art and I do not therefore wish to be limited except by the terms of my sub-joined claims as interpreted in the light of the generic spirit of my invention.

What I claim is:

1. A vehicle wheel including, in combination, a hub having a radially extending flange, dual wheel bodies each having a radially extending zone of attachment and having axially projecting portions adjacent the zones of attachment thereof, arranged for abutting cooperation securing means adapted to flex said discs toward each other in their zones of attachment after said axially projecting portions have been brought into abutment with each other and a metallic annulus having a plurality of individual annular flexing zones arranged for aligning cooperation with said securing means interposed between said wheel bodies in their zone of attachment.

2. A vehicle wheel including, in combination, a hub having a radially extending flange, dual wheel bodies mounted against said flange, each of said wheel bodies including a radially extending portion in its zone of attachment to the hub, an axially turned flange at the inner extremity of said radially extending portion and an axially turned rib at the outer extremity of said radially turned portion, said axially turned flanges and ribs extending respectively into abutment with each other, a metallic annulus interposed in said zone of attachment between said radially extending portions of said wheel bodies, limiting the axial flexing of the radial portion of the outer wheel body, said annulus having a plurality of annularly spaced coin portions extending axially to one side thereof, and axially extending securing means passing through said radially extending portions of said wheel bodies and said annulus to hold the same in assembled position upon said hub.

CAROLUS L. EKSERGIAN.